United States Patent Office 3,536,596
Patented Oct. 27, 1970

3,536,596
ELECTROCHEMICAL REDUCTION OF N-ALKYL AND N,N - DIALKYL 2,2 - DICHLOROACETO-ACETAMIDES
David L. Pearson, Aurora, Colo., assignor to Shell Oil Company, New York, N.Y., a corporation of Delaware
No Drawing. Filed May 14, 1968, Ser. No. 728,888
Int. Cl. B01k 1/00; C07c 103/02
U.S. Cl. 204—73   6 Claims

ABSTRACT OF THE DISCLOSURE

Selective electrochemical reduction of N-alkyl and N,N-dialkyl-2,2 - dichloroacetoacetamides to the corresponding N-alkyl and N,N-dialkyl-2-chloroaceto-acetamides by electrolyzing the dichloro-amide at a potential sufficient to selectively dechlorinate the dichloroamide to the monochloro-amide.

BACKGROUND OF THE INVENTION

Field of the invention

The present invention concerns the conversion of N-alkyl and N,N-dialkyl-2,2-dichloroacetoacetamides to the corresponding 2-monochloroacetoacetamides.

N-alkyl and N,N-dialkyl - 2 - chloroacetoacetamides are intermediates in synthesizing an important class of insecticides comprising dialkyl phosphates of 3 - hydroxycrotonic acids, as disclosed in the Whetstone and Stiles U.S. Pat. No. 2,802,855. The patent teaches that the insecticides can be prepared by reacting the appropriate trialkyl phosphite with the appropriate N-alkyl or N,N-dialkyl - 2 - chloroacetoacetamide to form an insecticide of the formula

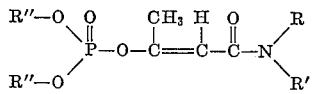

wherein R and R' are among other things hydrogen or alkyl, and both R" substituents may be many organic radicals, including alkyl.

It is highly desirable that the 2-chloroacetoacetamide reactants be substantially free of the 2,2-dichloroacetoacetamide analogs, as the latter amides will also react with the trialkyl phosphite to form the unwanted chlorinated products

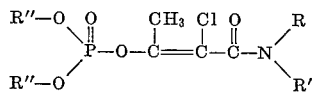

wherein R", R' and R are as described above.

These pollutants are highly undesirable as they are inferior insecticides and exhibit higher toxicity to mammals in comparison to the analogous unchlorinated compound.

Consequently, it is of great importance to prepare a substantially pure 2-chloroacetoacetamide precursor free of the 2,2-dichloro analog.

The above 2-chloroacetoacetamides are customarily prepared by chlorination of the corresponding aceto-acetamides. However, in the case of certain of these amides, for example, N-methylacetoacetamide, it has been found virtually impossible to prevent formation of substantial amounts of the corresponding 2,2-dichloroacetoacetamides. For example, even by the most effective chlorination procedures known, N-methyl-2-chloroaceto-acetamides can be produced in a purity of only about 80% to 85% with 15% to 20% of the 2,2-dichloro pollutant also being formed. Due to the close similarity of the physical properties of the monochloro and dichloro products, physical separation is not commercially feasible.

Therefore, the present process for selectively preparing N-alkyl, and N,N-dialkyl-2-chloroacetoacetamides substantially free of the 2,2 - dichloro analog is highly desirable.

SUMMARY OF THE INVENTION

Now it has been discovered in the present invention that N-alkyl and N,N-dialkyl-2,2-dichloroacetoacetamide may be reduced to N-alkyl and N,N-dialkyl - 2 - chloroacetoacetamide by electrochemical means wherein dichloroamide is electrolyzed at a potential sufficient to reduce it to the corresponding mono-chloroamide without further reducing the monochloro-amide.

PREFERRED EMBODIMENT OF THE INVENTION

The present invention comprises the electrochemical reduction, in liquid phase and under the conditions herein described, of a compound of the formula

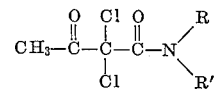

wherein R and R' are hydrogen or alkyl of 1 to 4 carbon atoms, to a compound of the formula

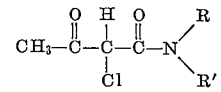

wherein R and R' are as described above.

The reduction of the dichloro-amide to the monochloroamide is represented by the following formulae for the electrolytic reactions.

CATHODE:

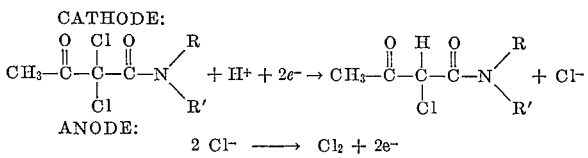

ANODE:

$$2\text{ Cl}^- \longrightarrow \text{Cl}_2 + 2e^-$$

The reduction is carried out in any standard anode-cathode electrolytic cell by electrolyzing the dichloro starting material to the monochloro product by maintaining the working electrode, the cathode, at a potential sufficient to selectively reduce the dichloro-amide to the monochloro amide without further reducing the monochloro-amide to the unchlorinated amide.

This unexpected selective reduction was made possible by the surprising discovery that the dichloro-amide may be electrochemically reduced at certain potentials without reducing the monochloro-amide to an amide or further degradation products.

For example, N-methyl - 2,2 - dichloroacetoacetamide (MMDCAA) was found to have a reduction potential of about −0.3 volt while the corresponding N-methyl-2-chloroacetoacetamide (MMCAA) was found to have a reduction potential of about −0.8 volt. Thus, by conducting the electrolysis at about −0.4 volt, it was found that MMDCAA was selectively reduced to MMCAA in conversions as high as 100% based on the moles of starting material used, and yields as high as 94% molar based on the molar of starting material used.

The dichloroacetoacetamides, described above, which are useful starting materials in the present process include 2,2-dichloroacetoacetamide
N-methyl-2,2-dichloroacetoacetamide
N,N-dimethyl-2,2-dichloroacetoacetamide
N-propyl-2,2-dichloroacetoacetamide
N-methyl-N-ethyl-2,2-dichloroacetoacetamide
N-methyl-N-ethyl-2,2-dichloroacetoacetamide
N,N-dibutyl-2,2-dichloroacetoacetamide
N-sec-butyl-N-methyl-2,2-dichloroacetoacetamide
and the like.

The starting amides such as N-methyl - 2,2 - dichloroacetoacetamide are prepared by chlorinating commercially available acetoacetamides such as N-methylacetoacetamide. All the above starting materials may be prepared by chlorinating acetoacetamides synthesized by methods known in the art. For example, the Whetstone and Stiles Pat. U.S. 2,802,855, issued Aug. 13, 1957, and the references therein teach a method for synthesis of the acetoacetamides, which in turn may be chlorinated to produce the above starting materials. The preferred starting materials are N-methyl- and N,N-dimethyl-2,2-dichloroacetoacetamide.

The electrolysis of the starting material is carried out in liquid phase. Suitable solvents for the process are any solvents which dissolve the starting material and which are inert in the process environment. For example, water is a suitable solvent for the preferred starting material, N-methyl-2,2-dichloroacetoacetamide.

In the case of all the starting materials, especially the higher weight compounds, the lower alkyl alcohols are suitable solvents. Examples of such are methanol, ethanol, propanol and hexanol. The alcohols may be used alone, in mixtures with one another, or in combination with water to provide a solvent in which the starting material is reasonably soluble.

Temperature at which the electrolysis is carried out is not a critical feature of the invention. Any temperature between the boiling point and freezing point of the reaction mixture is operable. In the case of the preferred starting material, MMDCAA, temperatures in the range of about 10° C. to 60° C., with the preferred range of about 20° C. to 50° C. are suitable. The process may be carried out at atmospheric, elevated or reduced pressures.

As set out in the above cathode electrolytic reaction formula, acid is consumed in the reduction. Further, the monochloro-amides suffer degradation in alkaline solutions. Therefore, the reaction mixture should be maintained at neutral or acidic conditions by the addition of acid, preferably a mineral acid. Examples of such acids are hydrochloric acid, sulfuric acid, and nitric acid. In the preferred reduction of MMDCAA to MMCAA hydrochloric acid has been found to be especially suitable. The addition of 1 to 10 moles of acid per mole of starting material is preferred with the addition of 1 to 2 moles of acid per mole of starting material being most perferred.

The cathode and anode used in the electrolytic reduction may be made of any material suitable for use as a cathode or anode which is inert under the reaction conditions. Preferred materials are copper, carbon, platinum and lead. The cathode and anode may be of the same material or of different materials.

The process may be carried out with or without the presence of a supporting electrolyte. Any salt known in the art as a supporting electroyte which is inert under the reaction conditions is suitable, for example, sodium chloride, potassium nitrate, and potassium chloride are suitable salts.

As mentioned above, the critical feature of this invention is maintaining the cathode at a constant potential which is sufficient to reduce the dichloro-amide to the monochloroamide, but which will not further reduce the monochloroamide. This critical reduction potential is chosen at or near the cathode potential needed to reduce the dichloro-amide, but which is sufficiently far enough away from the reduction potential of the monochloroamide to avoid further reduction of this latter compound.

For example, as stated above, the polarographic half-wave potential for the reduction of MMDCAA to MMCAA is −0.3 volt while the reduction of MMCAA to N-methylacetoacetamide (MMAA) is −0.8 volt. By conducting the electrolysis with a cathode potential anywhere between about −0.3 to −0.65 volt, the MMDCAA readily reduces to MMCAA with no appreciable reduction of MMCAA to MMAA. This selective reduction is preferably carried out at a cathode potential of between about −0.35 volt to −0.45 volt, with about −0.4 volt being the most preferred.

Similarly, the polarographic half-wave potential for the reduction of N,N-dimethyldichloroacetamide to N,N-dimethyl-chloroacetoacetamide is between about −0.01 to −0.2 volt whereas the half-wave potential for the reduction of N,N-dimethyl-chloroacetoacetamide to N,N-dimethyl-acetoacetamide is about −0.55 volt. Therefore, an electrolytic reduction carried out at a cathode potential of between about −0.01 to −0.45 volt selectively reduces the dimethyl dichloro-amide to the monochloro-analog with no appreciable reduction of the latter compound to N,N-dimethylacetoacetamide. The preferred cathode potential in this reduction is between about −0.05 to −0.4 volt, with the most preferred potential being between about −0.15 to −0.25 volt.

The current densities, in the present process may be maintained over a fairly wide range, as the current density on the cathode may be between about $1 \times 10^{-4}$ amps/in.$^2$, to $5 \times 10^{-1}$ amps/in.$^2$, with $3 \times 10^{-3}$ amps/in.$^2$ to $1 \times 10^{-1}$ amps/in.$^2$ being the range for the preferred starting compounds, N-methyl- and N,N-dimethyl-dichloroacetoacetamide.

The quantity of electricity passed through the solution is also conveniently expressed in Faradays per mole of material to be reduced. Considering the present reaction involves a change of two electrons, a Faraday is defined in this process as the amount of electricity theoretically needed to selectively reduce ½ mole of the starting material. Therefore, 2 Faradays, or 53.6 ampere hours ($2 \times 96,500$ coulombs) are theoretically needed to reduce one mole of the starting material.

However, since the actual average current efficiencies are temperature dependent, and may vary over a wide range with the temperature variance, the number of Faradays actually used in the process may be substantially larger than the calculated theoretical amount. For example, the current efficiency for the reduction of MMDCAA to MMCAA is about 52% at 20° C. and 78% at 50° C. Based on the 52% efficiency, about 101 amp-hours would be needed in the above reduction to selectively reduce one mole of starting material.

It is not essential in this system that a membrane separate the anode and cathode compartments of the electrolytic cell. Should a membrane be used, any suitable membrane known to the art which does not impose too high a resistance may be utilized. For example, cellophane, fine glass frit, porous polyvinyl chloride, and the like may be used. From the standpoint of economy and simplicity, it may be desirable to conduct the process without a membrane.

The reaction time is dependent upon the ratio of volume of reactant solution to electrode surface ratio. The greater this ratio, the longer the reaction time will be. Therefore, cathodes with a large surface area are desirable. Also, agitation of the solution by stirring or similar means will decrease the reaction time by bringing more reactant in contact with the cathode in a shorter period of time.

The product is formed at the cathode by cathodic reduction. The 2-chloroacetoacetamide products of the above structure include (referring to the respective dichloroacetoacetamides listed on page 4):

2-chloroacetoacetamide
N-methyl-2-chloroacetoacetamide
N,N-dimethyl-2-chloroacetoacetamide
N-propyl-2-chloroacetoacetamide
N-methyl-N-ethyl-2-chloroacetoacetamide
N,N-dibutyl-2-chloroacetoacetamide
N-sec-butyl-N-methyl-2-chloroacetoacetamide and the like. The products may be recovered from the electrolytic solution by distillation, crystallization, extraction, or any other means known to the art.

As N-methyl-2-chloroacetoacetamide is the preferred product of this process, the following examples will be discussed in terms of N-methylacetoacetamide as a starting material and 2-chloro-N-methylacetoacetamide as the product of the invention.

The examples demonstrate that the process of the invention produced 2-chloro-N-methylacetoacetamide in crude yields of up to 94% with a purity of up to 96% and free of all but negligible amounts of undesirable 2,2-dichloroacetoacetamide. This high purity and high yield of N-chloromethyl-acetoacetamide and the absence of unwanted impurities make the process of the invention highly desirable for the synthesis of 2-chloro-N-methylacetoacetamide for use as an intermediate in the above described synthesis of phosphate insecticides.

The novel and useful features of the process of the invention are illustrated by the following examples. It should be understood, however, that the examples are merely illustrative and are not to be regarded as limitations to the appended claims, since the basic teachings thereof may be varied at will as will be understood by one skilled in the art. In the examples, the proportions are given in parts by weight unless otherwise noted.

EXAMPLE I 1000 grams of 99% pure N-methyl-2,2-dichloroacetoacetamide (MMDCAA) dissolved in aqueous HCl-urea solution was selectively reduced to N-methyl-2-chloroacetoacetamide (MMCAA) by electrolysis in a conventional copper cathode-carbon anode electrolytic cell at a temperature of 20° C.

The potential on the working electrode, a copper cathode, was controlled at 0.40 volt versus a saturated calomel electrode, by applying to the cathode-anode couple an initial voltage of 2.3 volts which was gradually decreased to 1.8 volts over the reaction time of 5.8 hours with a corresponding decrease in the amperage from 1.8 to 0.8 amps by the use of a 3 to 12 volt D.C. rectifier whose voltage output was regulated by controlling the voltage input with an autotransformer.

The gradual applied voltage decrease was required as the applied potential of the working electrode tended to drift upwards as the reduction proceeded. In order to keep the cathode potential constant, the applied voltage to the cathode had to be decreased during the reaction with a subsequent decrease in current flow.

The resulting amide product was isolated from the electrolysis reaction mixture by 5 extractions, each with an equal weight of chloroform, and the combined extracts were stripped in a Rinco rotary evaporator to terminal conditions of 80° C. and torr. The residue, analyzed with a gas-liquid chromatograph, contained 91.1% MMCAA and 7.2% MMDCAA, with conversion of 98% and yield of 89% based on the moles of starting material used.

EXAMPLE II

By the technique of Example I, the experiments set forth in Table I below were conducted.

TABLE I

| Cell | | Reaction temp. | Applied potential, volts | Cathode potential, volts | Amperage | Duration, hours | Reaction mixture, grams | Percent make-up of reaction mixture | | Isolated product, percent w. | | Conversions and yields | |
|---|---|---|---|---|---|---|---|---|---|---|---|---|---|
| Anode | Cathode | | | | | | | MMCAA | MMDCAA | MMCAA | MMDCAA | MMDCAA conversion, percent M | MMCAA yield, percent M |
| Carbon | Copper | 50 | 4.5–2.6 | 0.40 | 8.0–1.0 | 4.8 | 800 | ------ | 99 | 92.3 | 2.0 | 100 | 88 |
| Do | do | 20 | 2.4–4.6 | 0.40 | 2.0–4.0 | 8.7 | 616 | 48.9 | 48.2 | 92.4 | ---- | 92 | 94 |
| Copper | do | 20 | ------ | 0.55 | ------ | 3.0 | 96 | 44.6 | 53.2 | 96.2 | 4.6 | 100 | 91 |
| Do | do | 20 | 1.0–1.6 | 0.4 | 1.5–4.5 | 4.0 | 223 | 44.6 | 53.2 | 94.5 | 2.0 | 100 | 89 |

I claim as my invention:

1. Method for the selective electrochemical reduction of amides of the formula

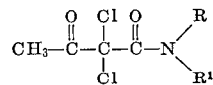

wherein R and R' is H or alkyl of 1 to 4 carbon atoms, to produce amides of the formula

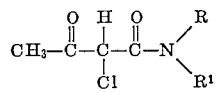

wherein R and $R^1$ are as described above, by electrolyzing the dichloro-amide in liquid phase wherein the cathode is maintained at a potential sufficient to selectively reduce the dichloro-amide to the monochloro-amide.

2. Method for the selective electrochemical dechlorination of amides of the formula

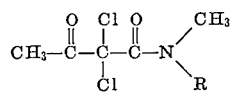

wherein R is H or $CH_3$, to produce amides of the formula

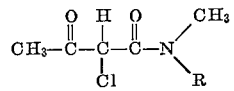

wherein R is as described above, by electrolyzing the dichloro-amide in liquid phase at a temperature between the freezing point and boiling point of the reaction mixture wherein the cathode is maintained at a potential of between about −0.35 to −0.45 volt when R is H, and between about −0.01 to −0.45 volt when R is $CH_3$, in the presence of between about 0.5 to 10 moles of hydrochloric acid per mole of dichloro-amide.

3. The method of claim 2 wherein R is H, the cathode potential is maintained between about −0.35 to −0.45 volt, 1.0 mole of hydrochloric acid per mole of starting material is present, and the temperature is between about 20° C. to 50° C.

4. The method of claim 2 wherein R is $CH_3$, the cathode potential is maintained at between about −0.05 to −0.4 volt, 1.0 moles of hydrochloric acid per mole of starting material is present, and the temperature is between about 20° C. to 50° C.

5. The method of claim 3 wherein the cathode potential is maintained at about −0.4 volt.

6. The method of claim 4 wherein the cathode potential is maintained at between about −0.15 to −0.25 volt.

References Cited

UNITED STATES PATENTS

| | | | |
|---|---|---|---|
| 1,627,881 | 5/1927 | Bellone | 204—73 XR |
| 3,425,919 | 2/1969 | Nagao et al. | 204—73 |

FOREIGN PATENTS

| | | |
|---|---|---|
| 848,807 | 9/1952 | Germany. |

JOHN H. MACK, Primary Examiner

F. C. EDMUNDSON, Assistant Examiner

U.S. Cl. X.R.

260—561